(12) United States Patent
Addleman et al.

US009259708B2

(10) Patent No.: US 9,259,708 B2
(45) Date of Patent: Feb. 16, 2016

(54) DEVICE AND METHOD FOR ENHANCED COLLECTION AND ASSAY OF CHEMICALS WITH HIGH SURFACE AREA CERAMIC

(75) Inventors: Raymond S. Addleman, Benton City, WA (US); Xiaohong Shari Li, Richland, WA (US); Wilaiwan Chouyyok, Richland, WA (US); Anthony D. Cinson, Richland, WA (US); John T. Bays, West Richland, WA (US); Krys Wallace, Kennewick, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 808 days.

(21) Appl. No.: 13/546,948

(22) Filed: Jul. 11, 2012

(65) Prior Publication Data

US 2014/0017805 A1 Jan. 16, 2014

(51) Int. Cl.
*G01N 1/40* (2006.01)
*B82Y 99/00* (2011.01)
*B01J 20/10* (2006.01)
*B01J 20/28* (2006.01)
*B01J 20/283* (2006.01)
*B01J 20/30* (2006.01)
*B01J 20/32* (2006.01)

(52) U.S. Cl.
CPC ............ *B01J 20/103* (2013.01); *B01J 20/2803* (2013.01); *B01J 20/283* (2013.01); *B01J 20/28042* (2013.01); *B01J 20/28054* (2013.01); *B01J 20/3042* (2013.01); *B01J 20/3078* (2013.01); *B01J 20/3234* (2013.01); *B01J 20/3293* (2013.01); *B01J 20/3295* (2013.01); *Y10T 436/255* (2015.01)

(58) Field of Classification Search
CPC .............. B01J 20/2803; B01J 20/3042; B01J 20/3234; B01J 20/28054; B01J 20/103; B01J 20/3242; B01J 20/3278; B01J 20/3285; Y10T 436/255; G01N 1/405; B01L 2200/0631
See application file for complete search history.

(56) References Cited

U.S. PATENT DOCUMENTS

| | | | |
|---|---|---|---|
| 6,251,280 B1 * | 6/2001 | Dai et al. | ........................ 210/656 |
| 6,481,301 B2 | 11/2002 | Pawliszyn | |
| 6,759,126 B1 | 7/2004 | Malik et al. | |
| 6,783,680 B2 | 8/2004 | Malik | |
| 6,802,227 B2 | 10/2004 | Lindgren et al. | |
| 6,905,031 B1 | 6/2005 | Miller et al. | |
| 7,045,366 B2 | 5/2006 | Huang et al. | |
| 7,087,437 B2 | 8/2006 | Wohleb | |
| 7,098,672 B2 | 8/2006 | Belyakov et al. | |
| 7,125,580 B2 | 10/2006 | Miller et al. | |
| 7,247,273 B2 | 7/2007 | Nunes et al. | |
| 7,629,029 B2 | 12/2009 | Mao et al. | |
| 7,665,374 B2 | 2/2010 | Akinbo et al. | |
| 7,674,631 B2 | 3/2010 | Pawliszyn | |
| 7,694,346 B2 | 4/2010 | Adams et al. | |
| 7,803,221 B2 * | 9/2010 | Magdassi | ................... B41J 3/28 106/31.6 |
| 7,955,547 B2 | 6/2011 | Plaksunov et al. | |
| 7,955,574 B2 | 6/2011 | Fryxell et al. | |
| 2009/0250349 A1 | 10/2009 | Malik et al. | |
| 2009/0301169 A1 | 12/2009 | Higgins et al. | |
| 2010/0058924 A1 | 3/2010 | Harvey | |
| 2010/0077837 A1 | 4/2010 | Fryxell et al. | |

OTHER PUBLICATIONS

Fan, Yi et al. "Ordered mesoporous silica coated capillary for in-tube solid phase microextraction coupled to high performance liquid chromatography." Analytica Chimica Acta (2005) 543 1-8.*
International Search Report and Written Opinion for International Application No. PCT/US2013/039958, International Filing Date May 7, 2013, Date of Mailing Aug. 21, 2013.
Hashemi, P., et al., Amino ethyl-functionalized nanoporous silica as a novel fiber coating for solid-phase microextraction, Analytica Chimica Acta, 646, 2009, 1-5.
Yan, X., et al., Array capillary in-tube solid-phase microextraction: A rapid preparation technique for water samples, Journal of Chromatography A, 1244, 2012, 69-76.
Pragst, F., Application of solid-phase microextraction in analytical toxicology, Anal. Bional. Chem., 2007, 388, 1393-1414.
Gaurav, V. K., et al., SPME-HPLC: A new approach to the analysis of explosives, Journal of Hazardous Materials, 2007, 147, 691-697.
Kataoka, H., Recent Advances in Solid-Phase Microextraction and Related Techniques for Pharmaceutical and Biomedical Analysis, Current Pharmaceutical Analysis, 2009, 1, 65-84.
Vas, G., et al., Solid-phase microextraction: a powerful sample preparation tool prior to mass spectrometric analysis, Journal of Mass Spectrometry, 2004, 39, 233-254.
Kataoka, H., et al., Applications of solid-phase microextraction in food analysis, Journal of Chromatography A, 880, 2000, 35-62.
Hyotylainen, T., et al., Sorbent- and liquid-phase microextraction techniques and membrane-assisted extraction in combination with gas chromatographic analysis: A review, Analytica Chimica Acta, 2008, 614, 27-37.
Risticevic, S., et al., Recent developments in solid-phase microextraction. Anal. Bioanal. Chem., 2009, 393, 781-795.
Arthur, C. L., et al., Solid Phase microextraction with thermal desorption using fused silica optical fibers, Anal. Chem., 1990, 62, 2145-2148.
Kumar, A., et al., A review on development of solid phase microextraction fibers by sol-gel methods and their applications, Analytica Chimica Acta, 2008, 610, 1-14.
Haberhauer-Troyer, C., et al., Surface characterization of commercial fibers for solid-phase microextraction and related problems in their application, Fresenius J. Anal. Chem., 2000, 366, 329-331.

(Continued)

*Primary Examiner* — Christopher A Hixson
(74) *Attorney, Agent, or Firm* — A.J. Gokcek (57) ABSTRACT

A method and device for enhanced capture of target analytes is disclosed. This invention relates to collection of chemicals for separations and analysis. More specifically, this invention relates to a solid phase microextraction (SPME) device having better capability for chemical collection and analysis. This includes better physical stability, capacity for chemical collection, flexible surface chemistry and high affinity for target analyte.

32 Claims, 4 Drawing Sheets

(56) References Cited

OTHER PUBLICATIONS

Augusto, F., et al., New sorbents for extraction and microextraction techniques, Journal of Chromatography A, 2010, 1217, 2533-2542.

Dietz, C., et al., Recent developments in solid-phase microextraction coatings and related techniques, Journal of Chromatography A, 2006, 1103, 183-192.

Breton, F., et al., Silicate-entrapped porous coatings for preparing high-efficiency solid-phase microextraction sorbents, Analytica Chimica Acta, 2010, 669, 39-44.

Chong, S. L., Sol-gel coating technology for the preparation of solid-phase microextraction fibers of enhanced thermal stability, Anal. Chem., 1997, 69, 3889-3898.

Guerra, P., et al., Analysis of the volatile chemical markers of explosives using novel solid phase microextraction coupled to ion mobility spectrometry, J. Sep. Sci., 2008, 31, 2891-2898.

Harvey, S. D., et al., Selective stationary phase for solid-phase microextraction analysis of sarin (GB), Journal of Chromatography A, 2002, 954, 217-225.

Wu, J., Preparation and applications of polypyrrole films in solid-phase microextraction, Journal of Chromatrography A, 2001, 909, 37-52.

Koster, E. H. M., et al., Fibers coated with molecularly imprinted polymers for solid-phase microextraction., Anal. Chem., 2001, 73, 3140-3145.

Liu, M., et al., Preparation and application of the sol-gel-deived acrylate/silicon co-polymer coatings for headspace solid-phase microextraction of 2-chloroethyl ethyl sulfide in soil, Journal of Chromatography A, 2005, 1076, 16-26.

Guan, W., et al., A new poly(phthalazine ether sulfone ketone)-coated fiber for solid-phase microextraction to determine nitroaromatic explosives in aqueous samples, Journal of Chromatography A, 2007, 1147, 59-65.

Chen, W., et al., High extraction efficiency for polar aromatic compounds in natural water samples using multiwalled carbon nanotubes/Nafion solid-phase microextraction coating, Journal of Chromatography A, 2009, 1216, 9143-9148.

Djozan, D., et al., A new porous-layer activated-charcol-coated fused silica fiber: application for determination of BTEX compounds in water samples using headspace solid-phase microextraction with capillary gas chromatography, Chromatographia, 1997, 45, 1, 183-189.

Hashemi, P., et al., Amino ethyl-functionalized nanoporous silica as a novel fiber coating for solid-phase microextraction, Analytica Chimica Acta, 2009, 646, 1-5.

Jara, A. A., et al., Studies of the surface charge of amorphous aluminosilicates using surface complexation models, Journal of Colloid and Interface Science, 2005, 292, 160-170.

Wang, Y., et al., Facile synthesis of ordered magnetic mesoporous y-Fe2)3/SiO2 nanocomposites with diverse mesostructures, Journal of Colloid and Interface Science, 2008, 326, 158-165.

Scarano, D., et al., Fourier-transform infrared and raman spectra of pure and Al-, B-, Ti- and Fe-substituted Silicates: Stretching-mode region, J. Chem. Soc. Faraday Trans., 1993, 82, 22, 4123-4130.

Moreno, E. M., et al., Preparation of narrow size distribution superparamagnetic y-Fe2O3 Nanoparticles in a Sol-Gel Transparent SiO2 Matrix, Langmuir, 2002, 18, 4972-4978.

Thomas, S., et al., Optically transparent magnetic nanocomposites based on encapsulated Fe304 nanoparticles in a sol-gel silica network, Nanotechnology, 2006, 17, 5565-5572.

Fu, Y., et al., Analysis of reaction process between Si and Fe in poly-silicic-ferric sulfate (PSF) coagulant, English Abstract, Huan Jing Ke Xue, 2007, 28.

\* cited by examiner

DEVICE AND METHOD FOR ENHANCED COLLECTION AND ASSAY OF CHEMICALS WITH HIGH SURFACE AREA CERAMIC

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to collection of chemicals for separations and analysis. More specifically, this invention relates to a solid phase microextraction (SPME) device(s) having better capability for chemical collection and analysis. This includes better physical stability, capacity for chemical collection, flexible surface chemistry and high affinity for target analyte(s).

BACKGROUND OF THE INVENTION

Solid phase microextraction (SPME) is a demonstrated and attractive method for sampling and preconcentrating trace level analytes, since it is a flexible, rapid, solvent-free extraction technique that is applicable to liquid and/or gas sampling environments. Further, SPME can be directly interfaced with wide range of analytical instrumentation for analyte detection such as gas chromatography (GC), gas chromatography mass spectroscopy (GC-MS), high-performance liquid chromatography (HPLC), liquid cromotography mass spectroscopy (LC-MS), and desorption electrospray ionization mass spectroscopy (DESI-MS), making it amenable to automation and a convenient technique. Due to its broad applicability and sensitivity SPME has been widely utilized in a variety of fields.

SPME was first successfully developed as a polymer coating on silica fibers in the early 1990s and, presently, various polymer phases are available commercially. Many types of polymers and composites with different chemical characteristics are available for the extraction of a variety of analytes of interest. Since polymer phases can be blended, different surface properties of polymers can simply be coated and tailored onto a single fiber. This leads to a certain extend application of polymer coated fibers in many fields.

However, a number of drawbacks of polymer SPME sometimes limit their applications. They are unstable with some solvents, have insufficient mechanical strength and tend to degrade at high operating temperatures. Additionally, the coatings are occasionally stripped, and they suffer from contaminations and unstable coatings on new fibers.

The demand for better chemical capacity, sensitivity, selectivity, as well as thermal, chemical, and mechanical stability has pushed continued research in the SPME field. Since the fiber coating is one of the most significant factors impacting SPME function, many different approaches have been explored to improve performance. For example, the sol-gel technology physically incorporated with polydimethysiloxane (PDMS) has been shown to enhance the thermal stability and sensitivity higher than normal PDMS. The planar geometry substrate was first applied for PDMS coating in order to increase the surface area and volume of the polymer phase, which subsequently enhances the capacity of SPME.

Certain coating polymers and polymer composites (i.e. BSP3 polymer, acrylate/silicone co-polymer, polyrrole, poly (phthalazine ether sulfone ketone)) and different preparation techniques (i.e. electrochemical, molecular imprinting, physical deposition) have also been employed to SPME for improved performance of the polymer coating.

SPME with nonpolymer coatings has been explored to overcome some of weakness of polymer coatings, specifically the limited capacity, selectivity, and chemical and thermal stability. Inorganic porous sorbents with high surface area such as, carbon nanotubes, activated charcoal, and porous silica coated SPME have been explored and reported to be effective materials for improvement in the extraction of analytes for some conditions. Metals and metal oxides such as, La (III), Al, and $Nb_2O_5$ have been investigated and developed for enhanced capturing and releasing of target analytes.

Among alternative nonpolymeric SPME materials, silica and silica composites are among the most promising coating materials. Some nanoporous silica materials can have a very high surface area per unit volume, sometimes over 1000 $m^2$/g, while retaining hydrothermal stability. Further, they are amenable to the installation of a wide range of surface chemistries. However, integrating the silica materials into a functioning SPME device is not a trivial task. Challenges include the fragile nature of fused silica support fibers (which need extra care during SPME manufacture and application), the brittleness of ceramic coatings, and the challenge of creating a uniform thin film on the silica support fiber. It is important to maintain the available surface area of nanoporous silica material during the attachment process of coating to the support. The retention of a large relative surface area offers installation of selective silane functional groups (able to obtain high density of binding sites), resulting in high sorption capacity and sensitivity to analytes of interest. Effectively attaching nanoporous material onto the SPME fibers depends upon the attachment method. A glue method utilizing epoxy has been reported for attaching functionalized/unfunctionalized mesoporous silica and other porous silica particles onto SPME supports.

Rapid detection of organic chemicals is important for a range of areas including biomedical, agricultural, industrial, environmental, forensic and a range of health and safety related areas. The threat of terrorism has heightened the significance of rapid fieldable detection of trace level organics for security concerns. SPME is an ideal approach for improving methods for sampling and analysis of the forensic signatures, chemical weapons and explosives.

What is needed is a device and method of making with improved capacity for trace analyte capture, enhanced affinity and selectivity of target analytes.

SUMMARY OF THE INVENTION

In one embodiment of the present invention, a device for enhanced collection of target analytes is disclosed. The device comprises a support surface and a thin film containing a plurality of nanopores bound to the support surface. The surface of the nanopores may include a chemistry installed therein for enhanced capture of target analyte(s).

In one embodiment, the nanopores are silica nanopores or some other porous ceramic.

The support surface may be a substrate. The substrate is, but not limited to, one of the following: a fiber, a metal wire, a planar support, and a tubular structure.

In one embodiment, the support surface is porous.

In one embodiment, the support surface is coated by the thin film containing micro and the nanopores. The porous thin film may be coated on the outside of the support surface. Alternatively, the nanoporous thin film may be coated on the inside of the support surface.

In one embodiment, the device further comprises a binder to increase the stability and uniformity of the thin film.

The surface chemistry may be, but not limited to, an organo-silane. The surface chemistry may comprise of multiple components to provide polyfunctional sorbent chemistry. The polyfunctional surface chemistry is, but not limited to, at least one of the following: organics, organometallics, metals, nanoparticle complex molecules, covalently bound molecules or combinations thereof.

The target analyte may be a gas-phase or liquid-phase. The gas or liquid-phase analyte is at least one of the following: explosives, explosive variants, chemical weapons agents, pesticides, and volatile organic compounds (VOCs).

In another embodiment of the present invention, a method of selective and specific capturing of target analytes is disclosed. The method comprises providing a support surface. The method further comprises coating the support surface with a thin film containing a plurality of nanopores. The nanoporous thin film can be coated on the inside or the outside of the support surface. A coating inside of a tubular support can be sued directly in commercial thermal desorption analytical systems such as GC, GC-MS or other. The method may also comprise of installing selective chemistry on the surface of the nanopores.

In one embodiment, the thin film is deposited on to the support surface by dip coating, molding or spray-on. The thin film may be subsequently sintered to solidify the structure and film adhesion to the support surface. A binder may be applied to increase the stability and uniformity of the thin film.

In another embodiment of the present invention, a device for enhanced capture of target analytes is disclosed. The device comprises a tubular support having open internal space. A nanoporous thin film is coated inside the tubular support. A surface of the nanopores may include a surface chemistry installed therein for improved affinity and selectivity of target analytes.

In one embodiment, the device further comprises equipment to collect separate and analyze the captured analytes.

In another embodiment of the present invention, a method of selective binding of target analytes at higher preconcentration factors is disclosed. The method comprises providing a tubular support having an empty space. The method further comprises coating the inside of the tubular support with a thin film containing a plurality of nanopores. The method also comprises installing surface chemistry on the nanopores. The method also comprises drawing a target analyte into the empty space for specific capture of the analyte with the nanopores containing the chemistry.

In one embodiment, the method further comprises collecting, separating and analyzing the captured analytes.

DETAILED DESCRIPTION OF THE PREFERRED EMBODIMENTS

The present invention is directed to methods and devices that have high capacity and affinity for the selective capture of targeted analytes, which include explosives, explosive variants (precursors), chemical weapon agents, pesticides and other volatile organic compounds (VOC's). These devices can exceed capacity and affinity compared to existing commercially devices by over a factor of 10 thereby allowing for improved trace level sampling and detection. Further an enormous range of surface chemistries can easily be installed providing flexibility in the breadth of analytes and applications.

In one embodiment of the present invention, novel solid phase microextraction (SPME) coatings are disclosed. The supports for the coatings may include a metal wire, flexible silica coated wire, or equivalent, to provide a rigid yet somewhat flexible support for selective thin film sorbent materials of the present invention.

The composition for a thin film coating the support can comprise at least one of several materials. The materials used in the thin film coatings may include, but are not nanoparticle and limited to, nanoporous silica, nanoporous alumina, a mixture of nanoporous material plus a binder agent (for adhesion), other micro and nano porous supports, or even the creation of porosity in a metal wire support itself.

The thin film coatings can be applied in multiple layers to increase thickness (surface area) as well as for adhesion enhancement. The thin film material can be applied in several ways, such as dip coating, molding, spray-on, or other.

The use of a binder agent in the thin film composition of the present invention may be included to film improve stability and adhesion as well as to promote mass flow for better sampling. As one example, during the assembly of SPME coatings, the thin film material is thermally cycled in a sintering process to stabilize the nanoporous silica plus binder, or other material, as well as remove the excess binder creating a high surface area thin film that is well affixed to the support wire. The addition of a binder agent not only improves the adhesion to the support surface, but also improves the overall film structure by increasing film porosity. In addition to creating a more uniform thin film, the use of a binder can stabilize normally unstable materials that are desired to be used for their high capacity properties.

Upon application of the nanoporous thin film onto the support surface, which can be a wire support surface, the thin film may be functionalized with specific chemistries to increase the selectivity and affinity for target analytes. The surface chemistries applied to the thin film include, but are not limited to silanes, organics, organometallics, metals, and complex molecules. The present invention encompasses the selection of chemistries as well as how the chemistries are applied to the thin film; covalent or non-covalent installation bonding to the base support.

The surface chemistries selected may have attributes of selectivity, thermal stability and high affinity to various target analytes of interest depending on the application. The surface chemistries used in the present invention may differ greatly compared to the commercially available SPME coatings such as polydimethysiloxane-divinylbenzene (PDMS-DVB). Unlike the polymer or waxlike coatings used is SPME the preferred chemistries are grafted to the surface in very thin layers, typically covalently bound high density monolayers. Silanes and phophoic acid are a preferred type of molecule enabling strong bonding to the surfaces. Aromatic silanes such as phenyl silanes are of particular interest since they have good thermal stability form good high density monolayers and have affinity for a range of analytes of interest. Surface chemistries with nonpolar (i.e. phenyl or alkane groups) and polar sites (i.e. metal or organometallic) are of interest since they provide a "mixed mode" of a fraction for some target analytes. Additional surface chemistries include the use of phosphine oxides or simple physisorbed low vapor pressure organics. Many analytes of interest contain polar and nonpolar molecules, some are semivolatile organics. A "mixed mode" surface provides improved affinity to all components of the semipolar and semivolatile compounds—many of which are of interest such as nitroaromatic explosives, nerve agents, pesticides, etc. Surface chemistries can be applied with complimentary characteristics for liquid or gas phase techniques.

In one embodiment, the present invention utilizes a nanoporous thin film bound to a support surface comprised of porous silica or other high surface area materials that can be applied to a variety of substrates such as a thin metal wire. This structure provides improved rigidity and capacity resulting in better durability and enhanced analyte capture in a SPME device. The SPME device can be fully integrated with an existing commercial SPME form factor for both analyte sampling and analytical analysis instrumentation.

Figure 1A:
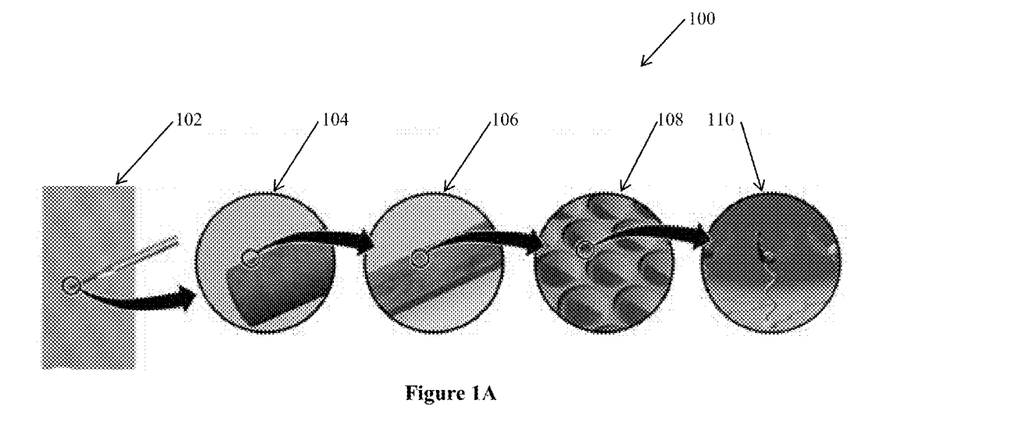
FIG. 1A graphically illustrates schematic images of a device and method for enhanced collection and assay of chemicals with high surface area ceramic in accordance with one embodiment of the present invention.

FIG. 1A illustrates schematic images of assembly of a nanoporous thin film device 100 including functionalized chemistry, in accordance with one embodiment of the present invention. In 102, a needle having a tip comprised of a filament or fiber with a thin film coating is shown entering a sample matrix. In 104, a magnified fiber is shown which is solid enough to be used as a collecting device or support surface. In 106, a sorbing thin film on the support structure is shown. The surface of the collecting fiber in 104 is coated or covered by the thin film. The thin film includes nanoparticles on the surface of the fiber. In 108, pores of the surface thin film are shown. The thin film contains a plurality of micropores and nanopores, and is bound to the support surface. The surface chemistry is shown in 110. The surface of the nanopores of 108 may include the surface chemistry of 110 installed therein for the improved capture of a target analytes. The surface of the nanopores may include specific chemistries for enhanced binding to the analyte of interest.

Figure 1B:
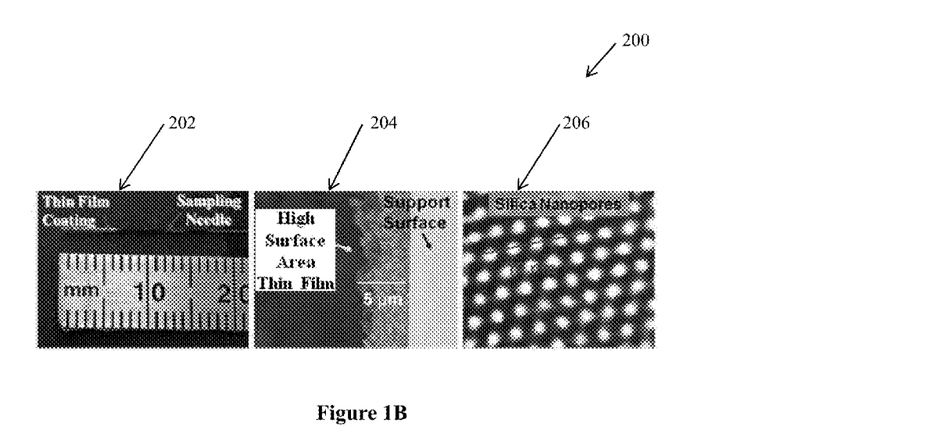
FIG. 1B illustrates magnified photographic images of a nanoporous silica thin film device, in accordance with one embodiment of the present invention.

FIG. 1B illustrates magnified photographic images of a nanoporous silica thin film device 200, in accordance with one embodiment of the present invention. In 202, the tip of the filament covered by the film is, in this example, about 6 millimeters, and the sampling needle extends beyond 12 millimeters. A magnified image of the nanoporous thin film bound to the support surface is shown in 204 along with the thickness of the pores. An electron microscopy image of silica nanopores is shown in 206. In this example, 5 pores cover approximately 10 nanometers.

Figure 4:
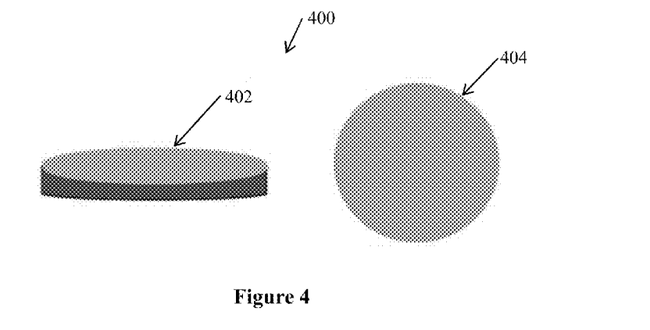
FIG. 4 shows side and top views of a nanoporous thin film on a planar support disc, in accordance with one embodiment of the present invention.

FIG. 4 shows side and top views 402 and 404 of a nanoporous thin film on a planar or flat support disc 400, in accordance with one embodiment of the present invention. This configuration can be used for enhanced durability and increased capacity.

Figure 5:
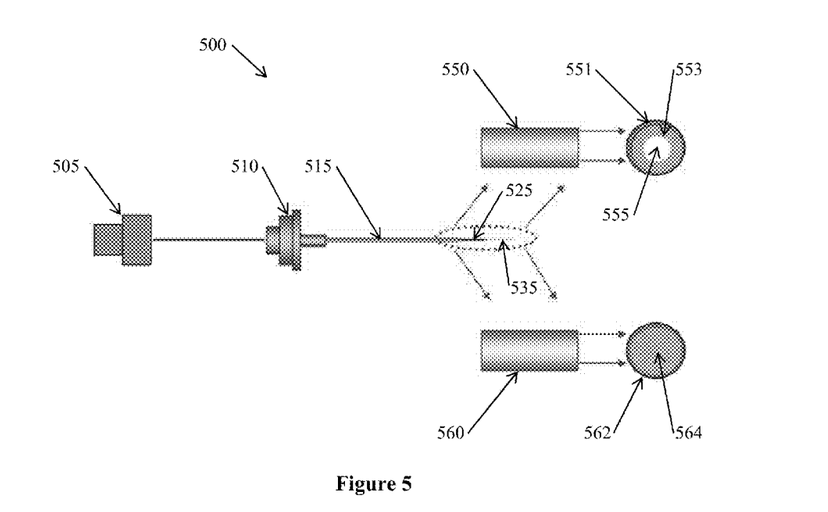
FIG. 5 illustrates alternative devices for capture of target analytes having a tubular structure with a thin film material coated inside of the structure, in accordance with certain embodiments of the present invention. This embodiment fully integrates with commercial SPME form factors and analytical desorption/testing equipment. In this embodiment, the thin film coating is located in the tubular structure's inner diameter (ID) walls or completely filling the structure with high surface area analyte collection material as visually displayed in FIG. 5. This type of embodiment provides a more robust support device for select field applications where damage of an external coating is probable.

FIG. 5 illustrates alternative devices 500 for selective and specific capture of target analytes having a tubular structure with a nanoporous thin film coated inside the tubular structure, in accordance with certain embodiments of the present invention. A handle 505 is couple to a holder or syringe section 510, which is connected to a tube 515 in the center. The tube 515 is a protective sheath in which a support tube structure 525 slides in and out of normally with a coated tip material 535. Two alternative configurations of the tube 525 are shown as 550 and 560. The tube 550 includes a tube wall 551, an internal coating 553 and an empty space 555 that can draw in air or water containing target analytes to be captured by the coating 553. Alternatively, the tube 560 includes a tube wall 562 and a solid coating material 564. The tube 560 has no visible empty space but rather micro pores for sample diffusion.

Experimental Section

The following examples serve to illustrate exemplary embodiments and aspects of the present invention and not to be construed as limiting the scope thereof.

Film Synthesis and Fabrication

The nanoporous silica (MCM-41 powder for example) was attached to a metal fiber substrate using a sintered thin film method. Synthetic methods are mentioned herein or referenced as appropriate. Comparisons of these materials to other approaches in literature are included in the results and discussion.

In the sintered thin film method, nano structured $SiO_2$ particle was used as a binder. The adhesion slurry and coating slurry were separately prepared. The attaching agent was prepared by mixing 3 g of Ludox SM, 30% $SiO_2$ nano particles with 6 g of $H_2O$ and 0.5 g of surfactant Legpal C0-720. The coating slurry was prepared from the ball milled MCM-41 of 0.5 μm mixed with Ferro B-75717 binder, IPA, and $C_{18}EO_{10}$ surfactant. The weight concentration of coating slurry was: 11.7% MCM-41, 52.7% Ferro B-75717, 33% IPA and 2.6% $C_{18}EO_{10}$. The cleaned fibers which were washed with 2-propanol were first dip coated with attaching slurry with 5 cm/minute lift rate. Then they were calcined at 350° C. for 1 hour. The coated fibers were finally dip coated with coating slurry with the lift rate of 2-20 cm/minute, then dried at 80° C. for 10 minutes. The dip coating and drying process were repeated 1-5 times to achieve desired the thickness. The coatings were heat treated in air at 3° C./minute, 550° C. for 4 hours.

Surface Functionalization

Functionalization of thin film. A 5 mm NMR tube containing fibers with modified end pointing up and several drops of the desired silane were added and 1-3 mL of toluene was also added. The tube was capped, mixed twice, then heated in a stirred water bath at 70-80° C. for 4 hours. The solvent was carefully drained, followed by two tube rinses of methanol rinse. The samples were air-dried.

Results and Discussion

The ability to increase the sensitivity with SPME pivots on the capacity of the sorbent layer which in turn scales with the available surface area of the sorbent material. The selectivity of the SPME is dependent upon the surface chemistry of sorbent material. Nanoporous silica (or other nanoporous ceramic) provide very high surface areas, desirable chemical and thermally stability as well as the ability to install a wide range surface chemistry. The general concept with graphical illustrations and actual images of the hierarchical assembly of the device is shown in FIGS. 1A and 1B.

The challenge of coating the nanoporous materials on a support surface, such as a metal wire, is the effective installation and functionalization of the nanoporous material into a SPME format that is stable and retains the advantageous properties. A number of methods to bind the nanoporous particles to the supporting SPME core fiber were explored here. Adhesive binding or "glue method" using epoxy as a binder is a method we found produced inferior results. Adhesive binding resulted in poor uniformity, blocked porosity, and limited capacity. Direct application of template Sol-gel coating formed thin films are also not uniform, had porosity that was often blocked, and had a propensity to flake off the support structure. Further processing conditions and techniques are required to obtain consistent and uniform desired structures as related to porosity, pore uniformity, flexibility etc. The sintered thin film application technique was a successful method for installation of nanoporous material onto a support structure. This method provided effective binding as well and ease of manufacture. The sintering thin film utilizes a two-step mechanism of silica formation. The first mechanism appears to involve the formation of Fe—O—Si and Al—O—Si between the surface of the steel wire and nano $SiO_2$ particle during the first calcination. The calcination removed organic binder, at the same time it allowed the silica particles in the thin film to adhere to each other and bind to the surface of the substrate. The calcination temperature needs to be carefully chosen since the low temperature did not support the formation of the strong Fe—O—Si bonding. On the other hand, the high temperature may affect the organic binder quickly removed before the Fe—O—Si or Al—O—Si is completely formed. The nano $SiO_2$ coated steel wire was then coated with nanoporous silica and calcinations again. The second silica formation occurred, after nanoporous silica was coated on nano $SiO_2$-steel wire, during the second calcination. Again, the proper calcination and sintered temperature is needed for the complete organic removal and for silica particles sintering. This sintering allows the formation of Si—O—Si between nanoporous silica and nano $SiO_2$ to occur while still retaining the high surface and porosity of the material. The calcination temperature was studied as a function of length shrinkage and surface are. Shrinkage data indicated that sintering was being started at 550° C. Meanwhile, the lower surface area was observed at the higher calcination temperature (≥650° C.), which is due to the collapsing of the pore structure. Therefore, the sintering was done at 550° C. for 4 hours to assure good binding of the nanoporous silica since Si—O—Si is a slow formation and probably takes a longer time than Fe—O—Si formation 40, and with minimal loss of structure/porosity. Thin film nanoporous silica coating calcined at 550° C. for 4 hours still retains their ordered pore structure and high surface area.

The binder agents and coating process play a role for effective coating of nanoporous silica on metal wires. Nanoporous silica was coated on steel wire for 1 cm length using sintering and adhesive methods. A uniform and smooth coating of nanoporous silica was obtained by using the sintering method. The presence of nanopartilces $SiO_2$ (calcined at 350° C. for 1 hour) improves the adhesion between coating and the substrate. The attached nanoporous silica with the binder displayed a uniform coating and smooth surface.

Figure 2:
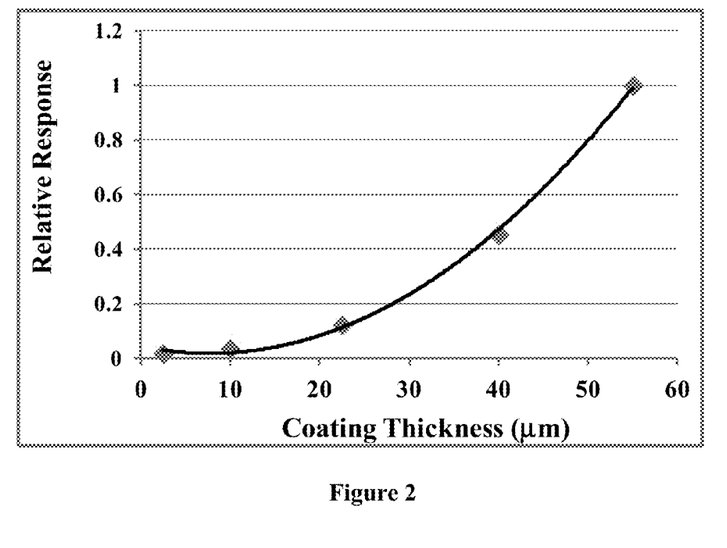
FIG. 2 is a graph showing results of nanoporous silica coated on steel wires with various coating thickness (~2.5-55 µm) exposed to DNT vapor (for 7 days for assured equilibrium) and subsequently analyzed with GC.

The thickness of new coating material is one of the more important parameters to be investigated and optimized for the development of a SPME sampling device. The thicker coating typically provides the higher volume results in higher capacity for the capture of analytes. However, it affects the equilibrium time, resulting in requiring a longer collection time. In this work, nanoporous silica coated steel wires with various coating thickness (~2.5-55 μm) were exposed to DNT vapor for 7 days and subsequently analyzed with GC as the results shown in FIG. 2. The enhanced sensitivity of SPME as measured by relative response trended as a function of film thickness (volume). Primarily, this was due to the active surface area being increased ~33 times as well as a growth in film volume as a function of film thickness. Increased film thickness indicated that the thin film allowed the DNT analyte to diffuse fully into the film thereby increasing capacity. It is important to note that the coating material and coating method has a large impact on features and properties of SPME (i.e. porosity, pore structure and organization, available binding sites, etc.), which affects the performance of SPME.

Chemically functionalizing the nanoporous thin films for enhance SPME can be done with a variety of different chemistries. By modifying the surface functionality of the thin film, the affinity for the analytes of interest can be increased and tuned. The surface functionality must be stable to the analysis conditions. Using silanes to covalently attach the surface functionalities to the nanoporous thin film (NPTF), the result is a stable surface modification.

In order to increase selectivity and affinity of functionalized nanoporous thin film (FNTF) toward explosive vapors, a variety of different silanes were used to modify the surface of the nanoporous thin film. These included phenyl, thiophenyl, 2,4-dintrophenyl, and thenyl trifluro acetone (TTA). The TTA modified nanoporous thin films were treated europium. It is well known that each analyte binds differently through chemical bonding (i.e. physical adsorption, hydrogen bond, covalent) to different surface chemistries. For recovering an analyte from a SPME for subsequent analysis is typically accomplished by heating until the organic compound volatizes off of the sorbent into the instrument. Therefore, the thermal stability of the sorbent and surface chemistry is important. Further, the surface chemistry must be stable to ensure repeatability with time and reversible to allow for recovery of analyte. A range surface chemistry has been explored for improved collection of explosive signatures for air and surfaces. The organics and organometallic modified nanoporous materials have a high thermal stability—the decomposition temperature in the range of 300-400° C.—as shown in Table 1.

TABLE 1

| Surface Chemistry (or Sorbent) | Decomposition Temp. ° C. Air |
| --- | --- |
| Tenax Resin | 450 |
| Propyl | 245 |
| Phenyl | 420 |
| Thiophenyl | 420 |
| Nitrophenyl | 320 |
| Lanthanide (Eu) Complex | 342 |

Figure 3:
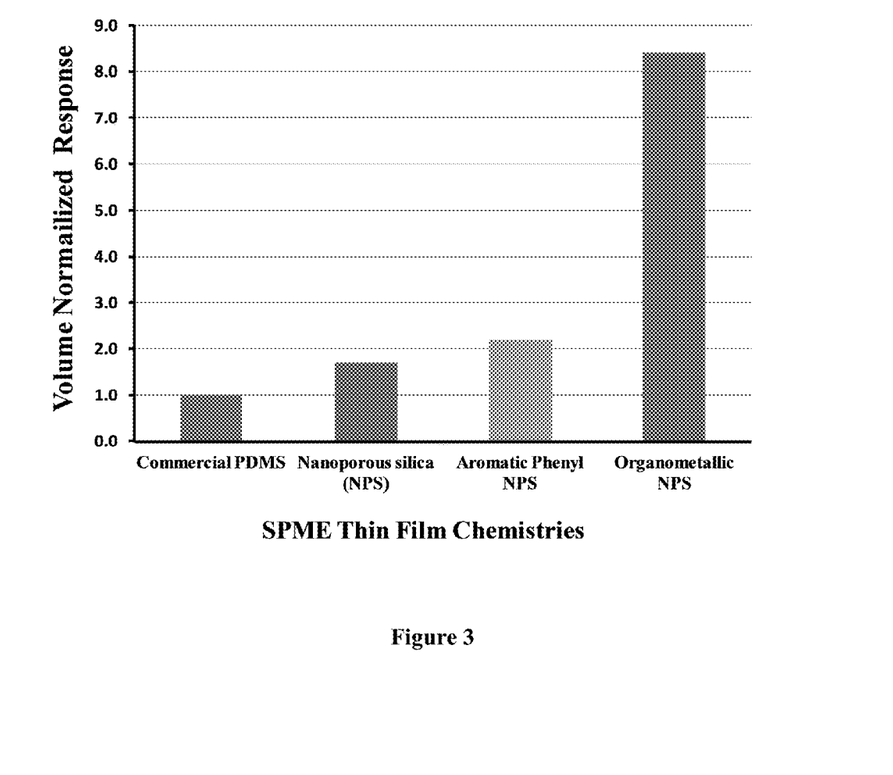
FIG. 3 is a bar chart comparing the sensitivity of a functionalized nanoporous silica coated metal wire compared to commercial SPME devices.

The surface chemistry installed on the thin film is one of the important factors that plays a major role in capture capacity, sensitivity, affinity and selectivity in analytes of interests. FIG. 3 shows ability to improve the selectivity/affinity of FNTF for collecting the analyte DNT in vapor phase by adjusting surface chemistries installed on the thin film.

The commercial SPME, the nanoporous silica thin film, and the variety of functional groups installed on the nanoporous thin films were exposed to DNT vapors for an equal period of time and tested on a GC-MS for performance comparison. The sensitivity of SPMEs were reported in the term of "response normalized volume" which were calculated from the obtained response per volume of coating thin film of SPME normalized to response per volume of coating thin film of the commercial SPME. The nanoporous silica coated metal wire exhibits the higher sensitivity (~1.8 times) than the commercial SPME. The organic and/or metal functionalized nanoporous silicas (FNTFs) also show significant improvement in sensitivity of SPME. Especially, organometallic coating FNTF shows the highest sorption capacity of DNT, ~8.5 times higher as compared to commercial SPME. The organometallic surface chemistry is a covalently bound beta diketone lanthanide complex. Other organometallic complexes such as Cu-thiol propyl silane are also effective. The very high affinity of DNT for FNTF suggests that sensitivity for collection of analyte of interests could be improved by selective surface chemistries. It also implies that surface chemistry has more impact for enhancing the affinity of SPME toward analytes than the surface area of fiber coating. However, again, the large surface area of fiber coating is necessary for providing the chemical or functional group installing.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A device for enhanced capture of target analytes, comprising:
   a. a support surface; and
   b. a thin film containing a mixture of at least two nanomaterials bound to the support surface, the mixture of the at least two nanomaterials including a first plurality of nanoporous particles, and a second plurality of nanoparticles as a binder to the nanoporous particles and the support surface, wherein the nanomaterials include a polyfunctional chemistry installed therein for capture of a target analyte.

2. The device of claim 1 wherein the nanoporous particles are silica nanoporous particles.

3. The device of claim 1 wherein the support surface is a substrate.

4. The device of claim 3 wherein the substrate is one of the following: a fiber, a metal wire, a planar support, and a tubular structure.

5. The device of claim 1 wherein the support surface is porous.

6. The device of claim 1 wherein support surface is coated by the thin film containing the mixtures of the nanoporous particles and the nanoparticles.

7. The device of claim 1 wherein the thin film is coated on the outside of the support surface.

8. The device of claim 1 wherein the thin film is coated on the inside of the support surface.

9. The device of claim 1 wherein the polyfunctional chemistry forms a sorbent layer.

10. The device of claim 9 wherein the sorbent layer is a silane, and other surface chemistries are installed such as physisorbed low vapor pressure organics or covalently bound surface chemistries such as phosphonic acid with organic components.

11. The device of claim 9 wherein the sorbent layer comprises the polyfunctional chemistry, wherein the polyfunctional chemistry is at least one of the following: organics, organometallics, metals, nanoparticle, complex molecules, and combinations thereof.

12. The device of claim 1 wherein the target analyte is a gas-phase or a liquid-phase analyte.

13. The device of claim 12 wherein the gas or liquid-phase trace level analyte is at least one of the following: explosives, explosive variants, chemical weapons agents, pesticides, and volatile organic compounds (VOCs).

14. A method of selective and specific capturing of target analytes comprising:
   a. providing a support surface;
   b. coating the support surface with a thin film containing a mixture of at least two nanomaterials bound to the support surface, the mixture of the at least two nanomaterials including a first plurality of nanoporous particles, and a second plurality of nanoparticles as a binder to the nanoporous particles and the support surface; and
   c. installing polyfunctional chemistry on a surface of the thin film to capture target analytes.

15. The method of claim 14 wherein the nanoporous particles are silica nanoporous particles.

16. The method of claim 14 wherein the support surface is a substrate.

17. The method of claim 16 wherein the substrate is one of the following: a fiber, a metal wire, a planar support, and a tubular structure.

18. The method of claim 14 wherein the thin film is coated on the outside of the support surface.

19. The method of claim 14 wherein the thin film is coated on the inside of the support surface.

20. The method of claim 14 wherein the thin film is deposited on to the support surface by at least one of the following: dip coating, molding, and spray-on.

21. The method of claim 20 wherein the thin film is subsequently sintered to solidify film adhesion to the support surface.

22. The method of claim 14 wherein the support surface is porous.

23. The method of claim 14 wherein the polyfunctional chemistry forms a sorbent layer.

24. The method of claim 23 wherein the sorbent layer is a silane.

25. The method of claim 23 wherein the sorbent layer comprises the polyfunctional chemistry, wherein the polyfunctional chemistry is at least one of the following: organics, metal centers, complex molecules, and combinations thereof.

26. The method of claim 14 wherein the target analyte is a gas-phase or a liquid-phase analyte.

27. The method of claim 26 wherein the gas or liquid-phase analyte is at least one of the following: explosives, explosive variants, chemical weapons agents, pesticides, drug, or volatile organic compounds (VOCs).

28. A device for selective and specific capture of target analytes, comprising:
   a. a tubular support having an empty space; and
   b. a thin film containing a mixture of at least two nanomaterials including a first plurality of nanoporous particles, and a second plurality of nanoparticles as a binder to the nanoporous particles and the tubular support, the thin film coated inside the tubular support, wherein a surface of the nanoporous particles includes polyfunctional chemistry installed therein for selective and specific capture of a target analyte drawn into the empty space.

29. A method of selective and specific capture of target analytes comprising:
   a. providing a tubular support having an empty space;
   b. coating the inside of the tubular support with a thin film containing a mixture of a first plurality of nanoporous particles, and a second plurality of nanoparticles as a binder to the nanoporous particles and the tubular support;
   c. installing polyfunctional chemistry on a surface of the nanoporous particles; and
   d. drawing a target analyte into the empty space for specific capture of the analyte with the nanoporous particles containing the chemistry.

30. The method of claim 29 further comprising separating and analyzing the captured analytes.

31. The device of claim 1 wherein the thin film is calcined at less than approximately 550° C.

32. The method of claim 14 further comprising calcining the thin film at less than approximately 550° C.

* * * * *